United States Patent [19]
Ryzhikov

[11] Patent Number: 5,898,524
[45] Date of Patent: Apr. 27, 1999

[54] MICROSCOPE OBJECTIVE WITH BALL LENS AND PROTECTION PLATE

[75] Inventor: Lev Ryzhikov, San Mateo, Calif.

[73] Assignee: Nikon Corporation, Japan

[21] Appl. No.: 08/759,506

[22] Filed: Dec. 4, 1996

[51] Int. Cl.⁶ .................................................. G02B 21/02
[52] U.S. Cl. .......................................... 359/657; 359/660
[58] Field of Search .................................... 359/656, 657, 359/658, 659, 660, 661

[56] References Cited

U.S. PATENT DOCUMENTS

| | | | |
|---|---|---|---|
| 3,405,993 | 10/1968 | Aklin et al. ............................ | 359/657 |
| 3,583,789 | 6/1971 | Rosenberger ........................... | 350/183 |
| 3,743,386 | 7/1973 | Aklin et al. ............................ | 359/657 |

Primary Examiner—Scott J. Sugarman
Attorney, Agent, or Firm—Skjerven, Morrill, MacPherson, Franklin & Friel LLP; Norman R. Klivans

[57] ABSTRACT

An objective lens system with protection glass for a microscope and having a numerical aperture of 1.25 and using an immersion oil, having a first, second, third and fourth lens groups, the first lens group being a plano-parallel plate cemented to a hemispherical lens, the second lens group being one aplanatic meniscus, the third lens group being three cemented doublets, and the fourth lens group being two lens components including a positive and a negative meniscus component which are arranged with their concave surface opposite each other. The objective lens system has a relatively small number of lens components, and the aberration, especially chromatic, spherical, coma, astigmatic difference and curvature of field, are corrected favorably.

15 Claims, 7 Drawing Sheets

Key To

MICROSCOPE OBJECTIVE WITH BALL LENS AND PROTECTION PLATE

BACKGROUND OF THE INVENTION

1. Field of Invention

This present invention relates to microscope objective lens systems and more particularly, to a plan-achromatic immersion type infinite microscope objective with numerical aperture 1.25 and a magnification of ×100.

2. Description of the Related Art

For most known microscope objectives of this kind, i.e. immersion plan-achromat microscope objectives with numerical aperture of 1.25 and a magnification of ×100, the chromatic, coma and spherical aberrations, astigmatic difference and curvature of field are not favorable.

Rosenberg U.S. Pat. No. 3,583,789 discloses at FIG. 4 a microscope objective which achieves a ×100 magnification and which includes a plano-parallel plate CI. This objective lens is of the oil immersion type having a suitable liquid located between the cover glass surface and the plano-parallel plate CI. The rear surface of the plano-parallel plate CI is cemented to the plane surface of a hemispherical lens element CII. However, this microscope objective lens does not achieve sufficient aberration correction, and Rosenberg appears not to have recognized the problem with aberration correction in connection with such a plano-parallel plate.

SUMMARY

In accordance with the present invention, an immersion-type microscope objective lens system with a protection plate has a relatively small number of lens components and has chromatic, spherical, and coma aberrations, astigmatic difference and curvature of field favorably corrected compared to known immersion plan-achromatic microscope objectives.

The present objective lens system has a hemispherical lens in its first lens group protected from mechanical and chemical exposure by a plano-parallel plate. The present microscope objective lens system preferably has four lens groups, preferably has less than ten lens components and has one plano-parallel plate component. The first lens group includes a plano-parallel plate cemented to the sample (object) planar side of a hemispherical lens component. It is preferable that the second lens group is one aplanatic meniscus lens component, the third lens group is three cemented doublets, and the fourth lens group is two lens components which are positive and a negative meniscus arranged with their concave surfaces opposite each other.

Also, the present microscope objective lens system preferably satisfies the following conditions:

$$0.28 > n_3 - n_2 > 0.12; \quad (1)$$

$$0.35 > n_4 - n_2 > 0.08; \quad (2)$$

$$45 > v_4 - v_3 > 20; \quad (3)$$

$$d_3 \cdot (n_3-1)/n^2_3 v_3 - 2 \cdot |S_4'^2 \phi_4 / v_4| \leq 0; \quad (4)$$

$$d_3 \cdot (n^2_3-1)/2n^3_3 \sin \omega^1 - 2 \cdot |h_4^2 \phi_4| \leq 0; \quad (5)$$

where $n_3$ is the index of refraction of the plano-parallel plate of the first lens group, $n_2$ is the index of refraction of the immersion oil between the plano-parallel plate and the cover glass, $n_4$ is the index of refraction of the hemispherical lens component, $v_3$ is 35 the Abbe number of the plano-parallel plate, $v_4$ is the Abbe number of the hemispherical lens component, $d_3$ is the thickness of the plano-parallel plate, $\phi_4$ is the refractive power of the hemispherical lens component, $S_4'$ is the image point distance of the hemispherical lens component, $\phi^1$ is the angle between the upper marginal ray and the optical axis after the plano-parallel plate, and $h_4$ is the height of the upper marginal ray for the hemispherical lens component.

Note that conditions (1) and (2) reduce to: $0.07 > n_4 - n_3 > -0.04$. Conditions (1) and (2) correct spherical aberration, including high orders, by requiring glass (material) with a comparatively high refractive index (compared to that of the immersion oil) for the plano-parallel plate and especially for the hemispherical lens component. This is because for the marginal ray, refraction is stronger and therefore angles of the marginal rays become less for a mean decrease of aberration. The upper limit in conditions (1) and (2) is defined from the glass "map" (i.e., availability of lens component materials); there are limited glasses having a high refractive index and also a high Abbe number. The lower limit in conditions (1) and (2) relates to aberration correction. If the differences of the parameters from condition (1) and (2) are below the stated limits, high order spherical and lower aberration will increase.

Conditions (3) and (4) relate to the correction of axial chromatic aberration in the microscope objective lens system. The upper limit for condition (3) is defined from the glass map, and the lower limit is to achieve better axial chromatic aberration correction. If the difference of the parameters of condition (3) is below the stated limit of condition (3), the objective lens system has large axial chromatic aberration. Condition (4) defines the relationship between the parameters of the hemispherical lens component and the plano-parallel plate for reciprocal chromatic aberration compensation.

Condition (5) defines the relationship between the parameters of the hemispherical lens, the plano-parallel plate, and the parameters of the marginal ray for spherical aberration correction.

Advantageously the plano-parallel plate provides chemical and mechanical protection for the planar surface of the hemispherical (ball) lens component. For use in a powerful (high magnification) lens system of the present type, a typical ball lens glass type has a high index of refraction, usually requiring a glass having poor mechanical and chemical resistance. Hence a glass of the type BK-7 is typically used for the ball lens component. The present inventor has recognized that it is advantageous to provide protection glass, i.e. the plano-parallel plate, to protect the object (planar) side of the ball lens component from chemical and mechanical damage. Note that this planar surface of the ball lens component in the prior art (although not in Rosenberg) is typically contacted by the immersion oil.

While Rosenberg discloses a plano-parallel plate cemented to the planar surface of a ball lens component, he does not even suggest that the same plano-parallel plate may be used to achieve aberration correction if of the appropriate material, especially in terms of its dispersion value (Abbe number). In the prior art typically an index of refraction of the ball lens is 1.515, whereas an index of refraction in the immersion oil is virtually the same, i.e. 1.517. Hence adding a protection glass layer (as in Rosenberg) is usually not considered desirable since it is hard to adjust for the diffraction caused by the protection glass which necessarily (to be effective protection) has a substantially different refractive index. It is believed that this is why the Rosenberg approach has not been widely used.

Thus the present inventor has recognized that it is possible to use the characteristics of the plano-parallel plate (the protection glass) to correct aberrations and especially to compensate for aberration caused by the ball lens component. At the same time, the remaining lens groups of the objective lens system overcome the problem of a higher working distance, caused by the presence of the protection glass.

Hence the present microscope objective lens system provides mechanical and chemical protection to the otherwise vulnerable ball lens component, while achieving the desired aberration correction and overcoming the increased working distance caused by the plano-parallel protection plate.

DETAILED DESCRIPTION

Figure 1:
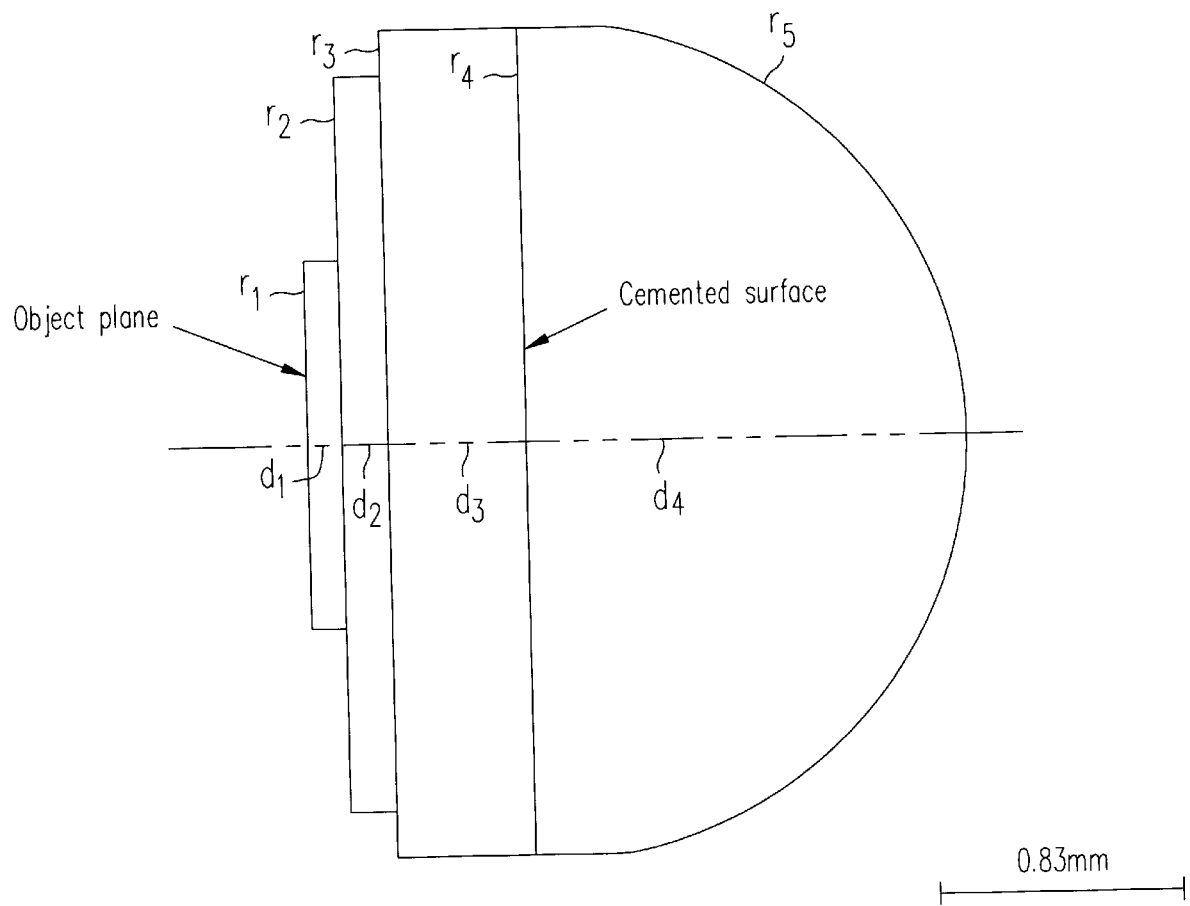
FIG. 1 shows a sectional view of the "head" portion of the present microscope objective lens system.

A first embodiment of the microscope objective lens with protection glass according to the present invention as explained above is disclosed hereafter in greater detail. In the present figures conventionally the object is to the left side of the drawing and the image to the right side.

FIG. 1 shows the "head" portion (object side) of the first embodiment of the present objective lens system. The designations of the optical surfaces and thicknesses in FIG. 1 refer to identical structures shown in FIG. 2. The structure having thickness $d_1$ and surfaces $r_1$ and $r_2$ is the cover glass which covers the sample to be imaged by the microscope and hence is not a portion of the objective lens per se but is shown for purposes of illustration. The immersion oil is defined by surfaces $r_2$ and $r_3$ and hence thickness $d_2$, and is a conventional immersion oil placed on top of the cover glass and hence also is not a portion of the objective lens per se.

The plano-parallel plate, having thickness $d_3$ and defined by surfaces $r_3$ and $r_4$, is cemented to the plane surface $r_4$ of the ball (hemispherical) lens component having thickness $d_4$ and having reverse surface $r_5$.

Figure 2:
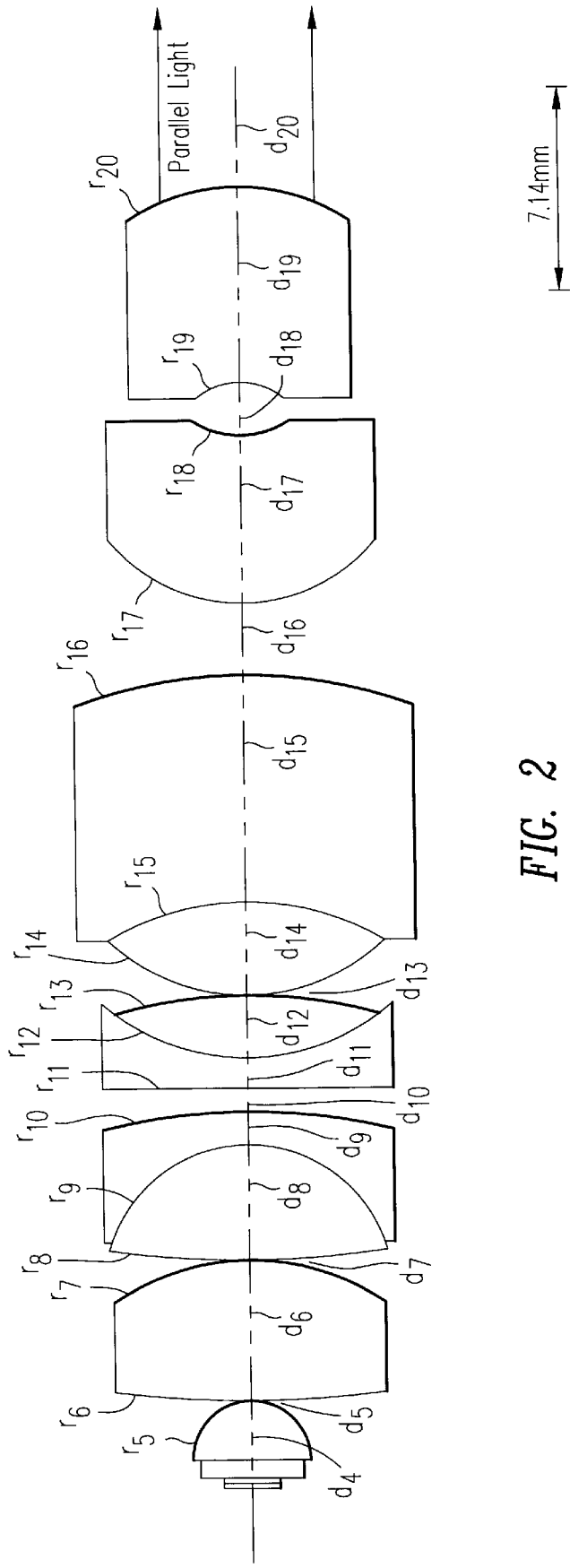
FIG. 2 shows a sectional view of a first embodiment of the present microscope objective lens system.

The structures shown in FIG. 1 are also shown in FIG. 2 in combination with the remaining lens groups of the present microscope objective lens system. The surfaces and structures shown in FIGS. 1 and 2 correspond to the optical listing shown below for embodiment 1.

The remainder of Embodiment 1 of the present microscope objective lens as shown in FIG. 2 includes a number of lens components as illustrated. The first lens group includes the plano-parallel plate and the ball lens component, terminating in surface $r_5$. The second lens group includes an aplanatic meniscus lens component having thickness $d_6$ and surfaces $r_6$, $r_7$. The third lens group includes three cemented doublets including six lens components-having thicknesses $d_8$, $d_9$, $d_{11}$, $d_{12}$, $d_{14}$ and $d_{15}$ and respective surfaces $r_8$, $r_9$, $r_{10}$, $r_{11}$, $r_{12}$, $r_{13}$, $r_{14}$, $r_{15}$, and $r_{16}$. The fourth lens group has two lens components including the positive meniscus component having thickness $d_{17}$ and surfaces $r_{17}$, $r_{18}$, and the negative meniscus component having thickness $d_{19}$ and surfaces $r_{19}$, $r_{20}$. As shown these are arranged having their concave surfaces facing one another.

Figure 3:
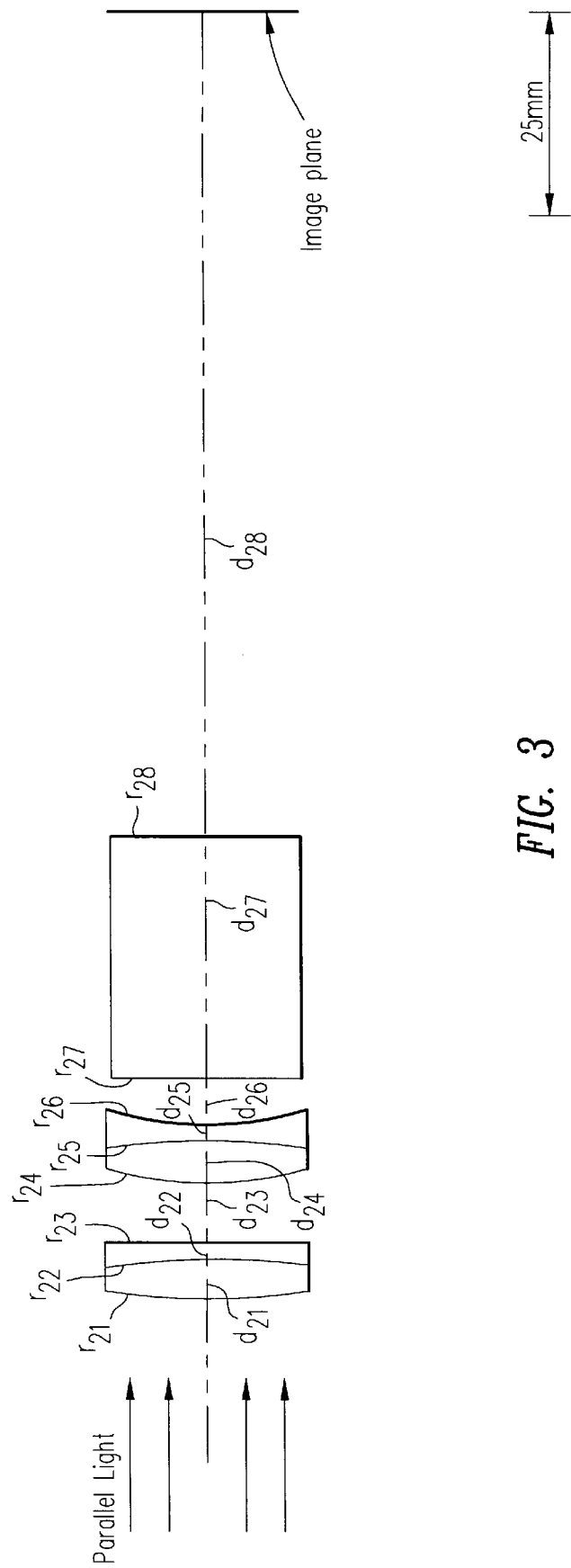
FIG. 3 shows a sectional view of a tube lens for use for image evaluation with the objective lens of FIG. 2.

FIG. 3 shows a tube lens to be used in conjunction with the objective lens of FIG. 2 and being on the image side i.e. the right hand side of the lens shown in FIG. 2.

This tube lens is shown merely for illustration; its optical characteristics are in the optical listing. The tube lens includes three lens groups which are a cemented doublet (surfaces $r_{21}$, $r_{22}$, $r_{23}$), a second cemented doublet (surfaces $r_{24}$, $r_{25}$, $r_{26}$), and a thick plano-parallel plate (surfaces $r_{27}$, $r_{28}$,). Note that the ×100 magnification of the present objective lens system includes the magnification provided by the tube lens.

Embodiment 1
f = 2 mm; NA = 1.25; Magnification = −100× (with tube lens);
WD = .21 mm

| Surface Radius mm | Distance/ Spacing mm | Refractive Index | Abbe Number |
|---|---|---|---|
| $r_1$ = Infinity | $d_1$ = .17 | $n_1$ = 1.5222 | $v_1$ = 58.8 |
| $r_2$ = Infinity | $d_2$ = .21 | $n_2$ = 1.5154 (Immersion oil) | $v_2$ = 41.4 |
| $r_3$ = Infinity | $d_3$ = .624 | $n_3$ = 1.63834 | $v_3$ = 34.6 |
| $r_4$ = Infinity | $d_4$ = 2.048 | $n_4$ = 1.59319 | $v_4$ = 67.9 |
| $r_5$ = 1.9304 | $d_5$ = .10 | air | |
| $r_6$ = 37.1144 | $d_6$ = 4.974 | $n_6$ = 1.73046 | $v_6$ = 25.4 |
| $r_7$ = 8.0411 | $d_7$ = .10 | air | |
| $r_8$ = 46.7168 | $d_8$ = 4.078 | $n_8$ = 1.43425 | $v_8$ = 95.0 |
| $r_9$ = 5.0210 | $d_9$ = 1.10 | $n_9$ = 1.46450 | $v_9$ = 65.8 |
| $r_{10}$ = 22.9367 | $d_{10}$ = .876 | air | |
| $r_{11}$ = 231.9575 | $d_{11}$ = 1.10 | $n_{11}$ = 1.86074 | $v_{11}$ = 23.0 |
| $r_{12}$ = 7.4019 | $d_{12}$ = 2.12 | $n_{12}$ = 1.43375 | $v_{12}$ = 95.2 |
| $r_{13}$ = 17.3873 | $d_{13}$ = .10 | air | |
| $r_{14}$ = 7.2843 | $d_{14}$ = 3.20 | $n_{14}$ = 1.43385 | $v_{14}$ = 95.2 |
| $r_{15}$ = 9.1502 | $d_{15}$ = 8.00 | $n_{15}$ = 1.86074 | $v_{15}$ = 23.0 |
| $r_{16}$ = 16.0698 | $d_{16}$ = 2.63 | air | |
| $r_{17}$ = 6.0601 | $d_{17}$ = 5.87 | $n_{17}$ = 1.86074 | $v_{17}$ = 23.0 |
| $r_{18}$ = 2.6622 | $d_{18}$ = 1.83 | air | |
| $r_{19}$ = 2.1113 | $d_{19}$ = 6.87 | $n_{19}$ = 1.86074 | $v_{19}$ = 23.0 |
| $r_{20}$ = 6.6504 | $d_{20}$ = 164.0 | air | |
| $r_{21}^*$ = 75.0 | $d_{21}^*$ = 5.10 | $n_{21}^*$ = 1.623 | $v_{21}^*$ = 57.0 |
| $r_{22}^*$ = 75.0 | $d_{22}^*$ = 2.00 | $n_{22}^*$ = 1.750 | $v_{22}^*$ = 35.2 |
| $r_{23}^*$ = 1600.0 | $d_{23}^*$ = 7.5 | air | |
| $r_{24}^*$ = 50.2 | $d_{24}^*$ = 5.10 | $n_{24}^*$ = 1.667 | $v_{24}^*$ = 42.0 |
| $r_{25}^*$ = 84.5 | $d_{25}^*$ = 1.80 | $n_{25}^*$ = 1.613 | $v_{25}^*$ = 44.4 |
| $r_{26}^*$ = 36.9 | $d_{26}^*$ = 5.5 | air | |
| $r_{27}^*$ = Infinity | $d_{27}^*$ = 30.0 | $n_{27}^*$ = 1.569 | $v_{27}^*$ = 56.0 |
| $r_{28}^*$ = Infinity | $d_{28}^*$ = 143.82 | | air |

*Portion of tube lens

Note that surfaces $r_{21}$ to $r_{28}$, are in the tube lens, and are not part of the objective lens per se.

The radiuses of curvature on the surfaces of the respective lens components are $r_1$ through $r_{28}$; the thicknesses of the respective lens components and air reserved therebetween are $d_1$ through $d_{28}$; the refractive indices of the lens components are $n_1$ through $n_{27}$; the Abbe numbers of the lens components are $v_1$ through $v_{27}$; the numerical apertric is NA, the working distance is WD, and the focal length is f.

It is to be appreciated that the presently described objective lens system and tube lens provide only a portion of the actual microscope; the eyepiece portion, which is conventional and located on the image side of the tube lens, is not illustrated.

The actual glasses to be used, in accordance with the optical listings, are of commercially available types.

Figure 4:
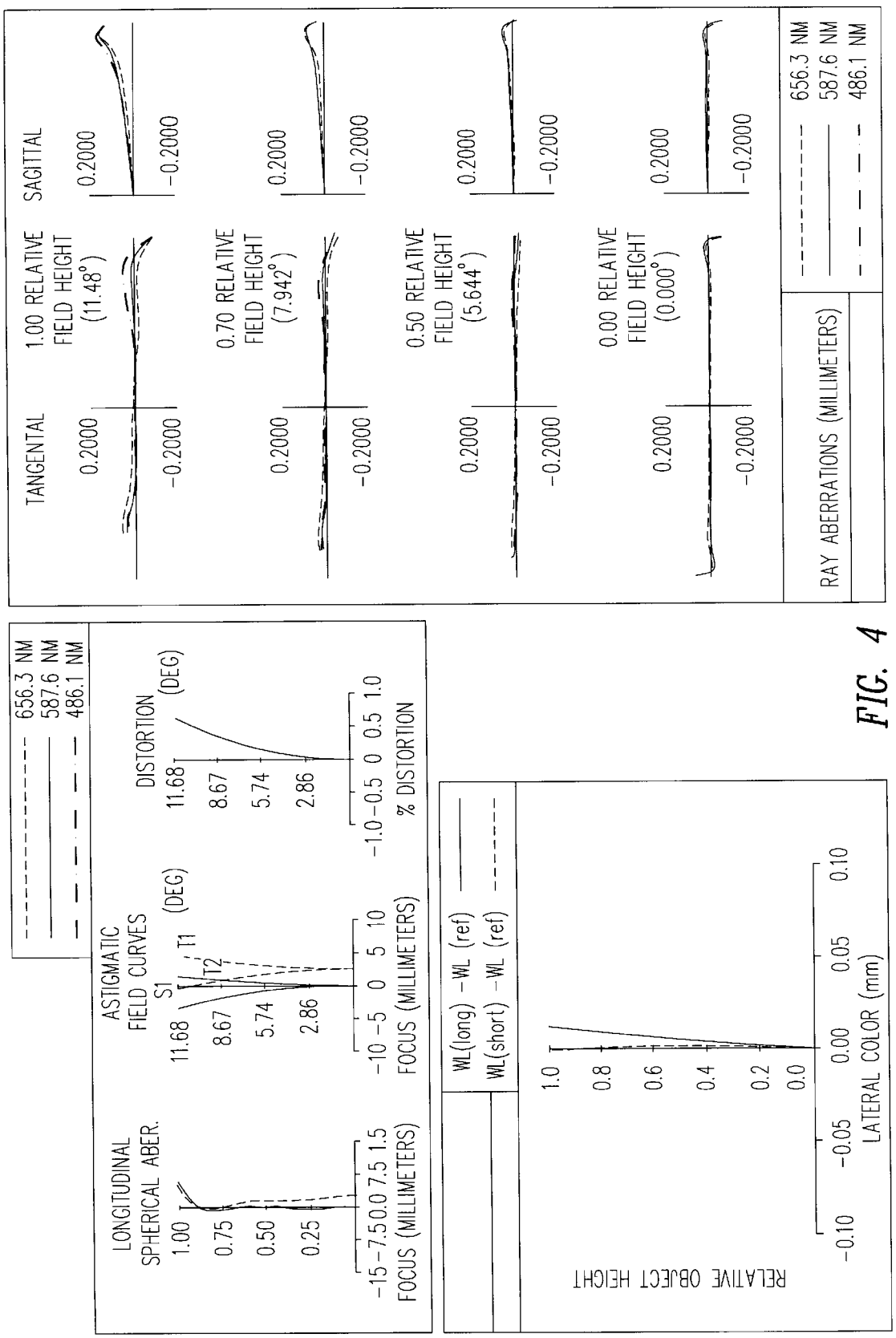
FIG. 4 shows graphs illustrating aberration curves of the embodiment of FIG. 2.

FIG. 4 shows aberration curves of the embodiment of FIGS. 2 and 3.

Figure 5:
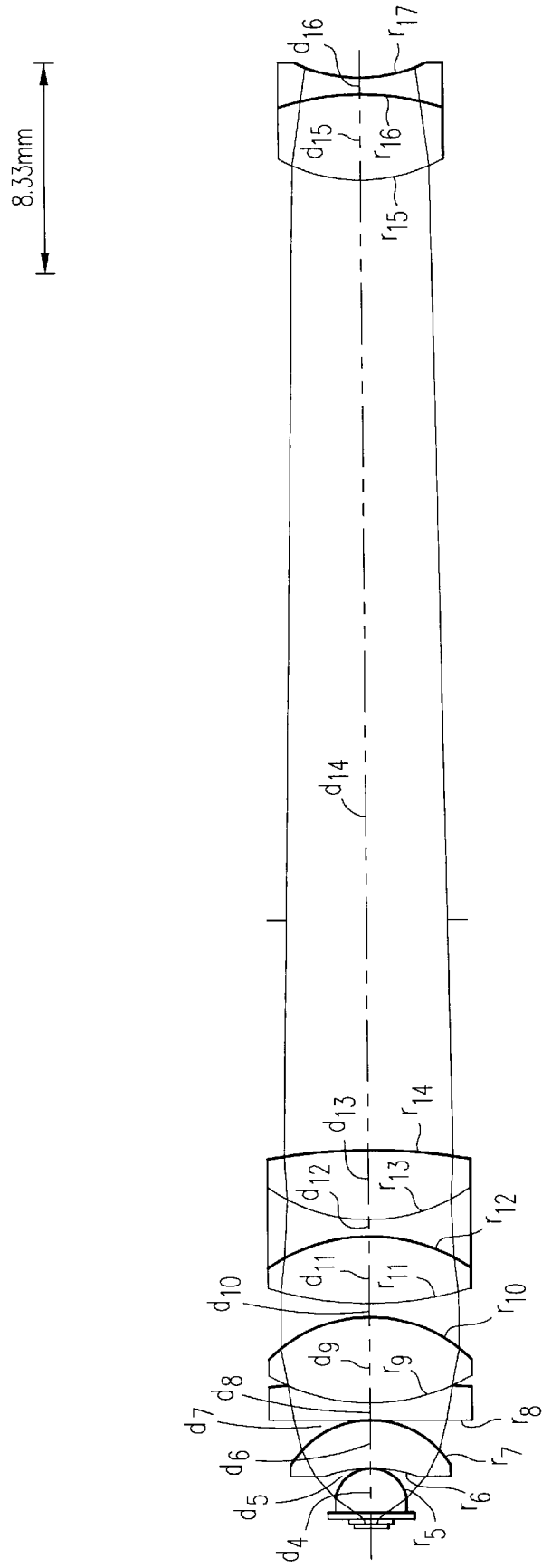
FIGS. 5 and 6 show, respectively, a sectional view and graphs illustrating aberration curves of a second embodiment.
Figure 6A:
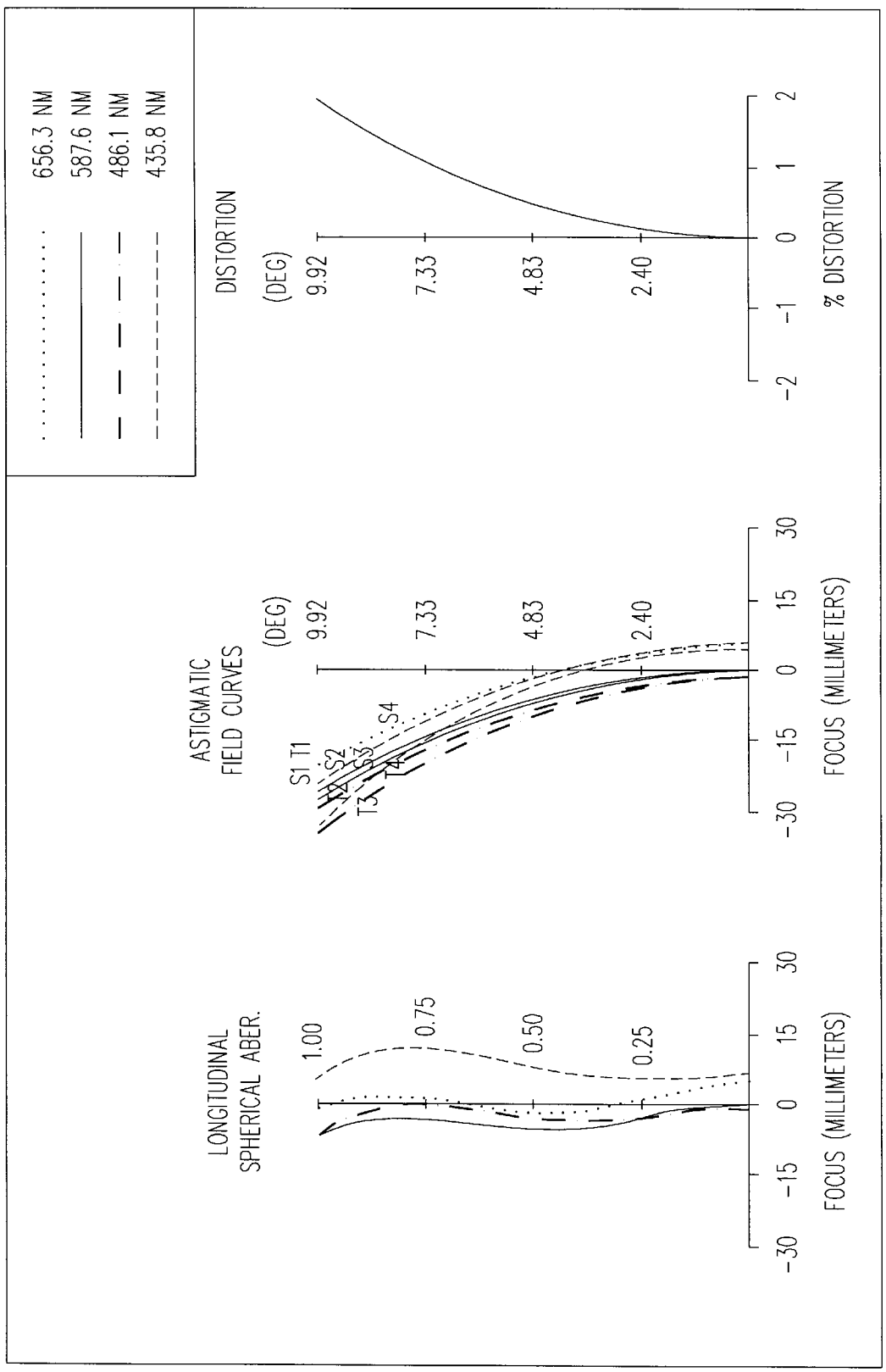
Figure 6B:
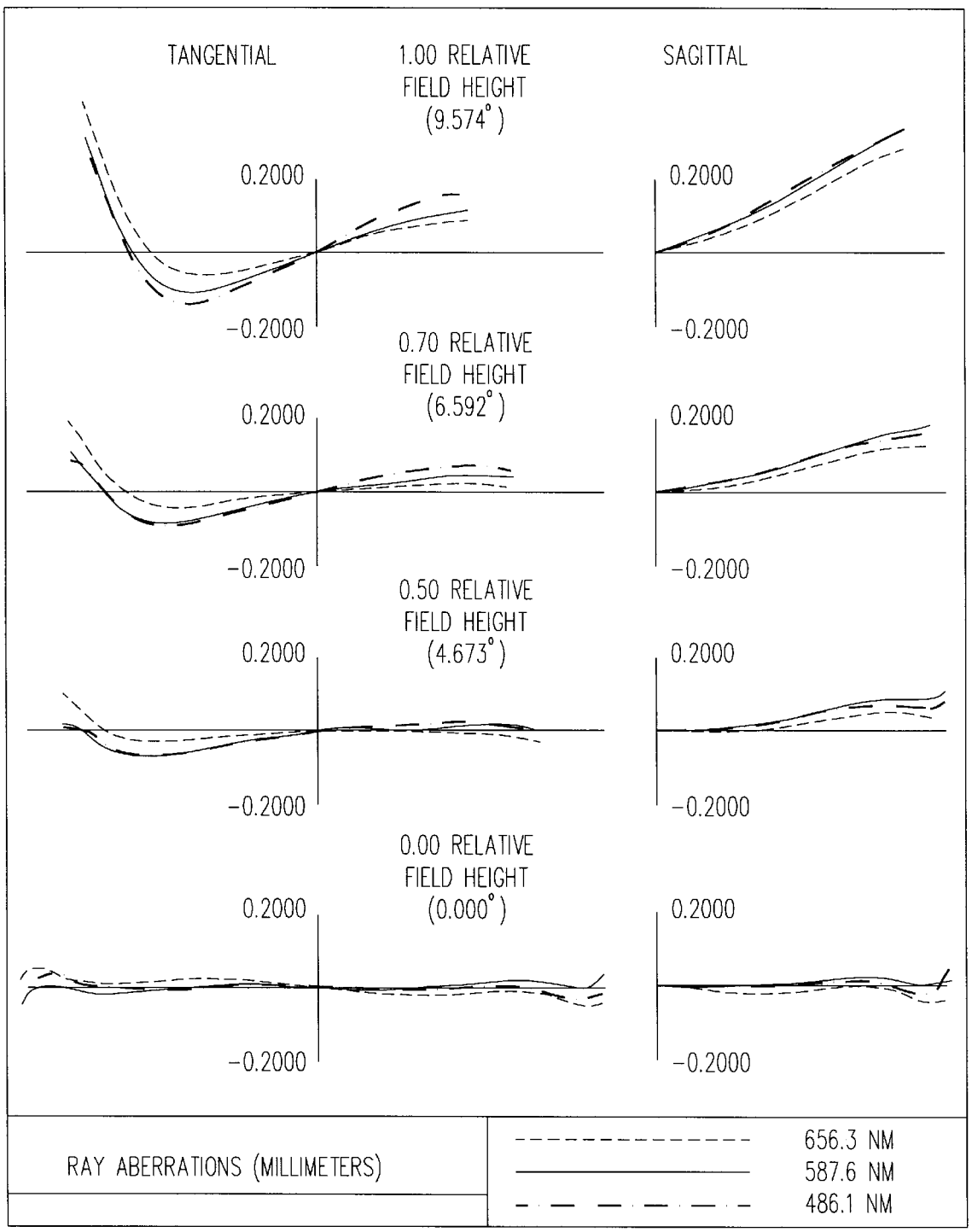
Figure 6:
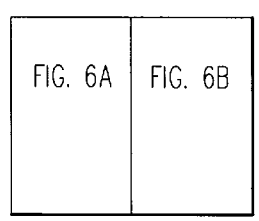

FIGS. 5 and 6 show respectively, for a second embodiment of the present microscope objective lens, a sectional view and corresponding aberration curves. This embodiment is also to be used with a tube lens as in FIG. 4. An optical listing for this second embodiment follows.

Embodiment 2
f = 2 mm; NA = 1.25; Magnification = −100× (with tube lens); WD = .21 mm

| Surface Radius mm | Distance/ Spacing mm | Refractive Index | Abbe Number |
|---|---|---|---|
| $r_1$ = Infinity | $d_1$ = .17 | $n_1$ = 1.5222 | $v_1$ = 58.8 |
| $r_2$ = Infinity | $d_2$ = .24 | $n_2$ = 1.5154 (Immersion oil) | $v_2$ = 41.4 |
| $r_3$ = Infinity | $d_3$ = .2 | $n_3$ = 1.7550 | $v_3$ = 27.6 |
| $r_4$ = Infinity | $d_4$ = 1.9 | $n_4$ = 1.593 | $v_4$ = 50.8 |
| $r_5$ = −1.6392 | $d_5$ = .1 | air | |
| $r_6$ = −7.66098 | $d_6$ = 2.0 | $n_6$ = 1.7707 | $v_6$ = 50.2 |
| $r_7$ = −3.997 | $d_7$ = .1 | air | |
| $r_8$ = Infinity | $d_8$ = .75 | $n_8$ = 1.6200 | $v_8$ = 36.3 |
| $r_9$ = 8.6126 | $d_9$ = 3.8 | $n_9$ = 1.4339 | $v_9$ = 95.2 |
| $r_{10}$ = −5.9768 | $d_{10}$ = .598 | air | |
| $r_{11}$ = 15.417 | $d_{11}$ = 3.0 | $n_{11}$ = 1.4339 | $v_{11}$ = 95.2 |
| $r_{12}$ = −7.1999 | $d_{12}$ = .75 | $n_{12}$ = 1.5814 | $v_{12}$ = 40.8 |
| $r_{13}$ = 7.433 | $d_{13}$ = 3.0 | $n_{13}$ = 1.4339 | $v_{13}$ = 95.2 |
| $r_{14}$ = −29.675 | $d_{14}$ = 36.142 | air | |
| $r_{15}$ = 8.2198 | $d_{15}$ = 3.6 | $n_{15}$ = 1.5481 | $v_{14}$ = 45.9 |
| $r_{16}$ = −11.006 | $d_{16}$ = .75 | $n_{16}$ = 1.6031 | $v_{16}$ = 60.6 |
| $r_{17}$ = 7.262 | $d_{17}$ = 146.5 | air | |
| $r_{18}$ = 75.0 | $d_{18}$ = 5.10 | $n_{18}$ = 1.623 | $v_{18}$ = 57.0 |
| $r_{19}$ = −75.0 | $d_{19}$ = 2.0 | $n_{19}$ = 1.750 | $v_{19}$ = 35.2 |
| $r_{20}$ = −1600.00 | $d_{20}$ = 7.5 | air | |
| $r_{21}$* = 50.2 | $d_{21}$* = 5.10 | $n_{21}$* = 1.667 | $v_{21}$* = 42.0 |
| $r_{22}$* = 84.5 | $d_{22}$* = 1.80 | $n_{22}$* = 1.613 | $v_{22}$* = 44.4 |
| $r_{23}$* = 36.9 | $d_{23}$* = 5.5 | air | |
| $r_{24}$* = Infinity | $d_{24}$* = 30.0 | $n_{24}$* = 1.569 | $v_{24}$* = 56.0 |
| $r_{25}$* = Infinity | $d_{25}$* = 143.82 | air | |

*Portion of tube lens

While only two single embodiments of the present objective lens are shown herein, other embodiments are possible by varying the parameters within the above-described conditions in accordance with the present invention.

This disclosure is illustrative and not limiting; further modifications will be apparent to one skilled in the art in the light of this disclosure and are intended to fall within the scope of the present claims.

I claim:

1. A microscope objective lens system with a protection component, comprising:
    a first lens group having a hemispherical lens component and a plano-parallel plate cemented to an object side of the hemispherical lens component, and where $45 > v_4 - v_3 > 20$, where, $v_4$ and $v_3$ are respectively Abbe numbers of the material of the plano-parallel plate and the hemispherical lens component; and
    wherein the ratio WD/f is approximately 1.05, where WD is the working distance of the microscope objective lens system and f is the focal length.

2. The microscope objective lens system of claim 1, where at least one of the following conditions is met:

$$0.28 > n_3 - n_2 > 0.12, \text{ and}$$

$$0.35 > n_4 - n_2 > 0.08,$$

where $n_3$ is the index of refraction of the material of plano-parallel plate of the first lens group, $n_2$ is the index of refraction of immersion liquid between the plano-parallel plate and a cover glass, and $n_4$ is the index of refraction of the material of the hemispherical lens component.

3. The microscope objective lens system of claim 1, where the following condition is met:

$$d_3 \cdot (n_3 - 1)/n^2_3 v_3 - 2 \cdot |S_4'^2 \phi_4 / v_4| \leq 0;$$

where $v_4$ is the Abbe number of the material of the hemispherical lens, $v_3$ is the Abbe number of the material of the parallel plate, $d_3$ is the thickness of the plano-parallel plate, $\phi_4$ is the refractive power of the hemispherical lens component, and $S_4'$ is the image point distance of the hemispherical lens, and $n_3$ is the index of refraction of the material of the plano-parallel plate.

4. The microscope objective lens system of claim 1, where the following condition is met:

$$d_3 \cdot (n^2_3 - 1)/2n^3_3 \cdot \sin \phi^1 - 2 \cdot |h^2_4 \phi_4| \leq 0;$$

where $\omega^1$ is the angle between the upper marginal ray and the optical axis after the plano-parallel plate, $h_4$ is the height of the upper marginal ray for the hemispherical lens component, $n_3$ is the refractive index of the material of the plano-parallel plate, and $d_3$ is the thickness of the plano-parallel plate.

5. The microscope objective of claim 1, having a numerical aperture of about 1.25 and a magnification of about ×100.

6. The microscope objective of claim 1, further comprising:
    a second lens group, juxtaposed to said first lens group;
    a third lens group, juxtaposed to said second lens group, and having three cemented doublets; and
    a fourth lens group, juxtaposed to said third lens group, having two lens components which are respectively a positive and a negative meniscus arranged with their concave surfaces opposite each other.

7. The microscope objective of claim 1, further comprising:
    a second lens group, juxtaposed to said first lens group, having an aplanatic meniscus lens component.

8. A microscope objective lens system having a protection structure, and comprising:
    a hemispherical lens component; and
    a protection structure, cemented to an object side of the hemispherical lens component, and disposed towards an object side of the lens system, for protecting the hemispherical lens component from damage;
    satisfying the condition:

$$45 > v_4 - v_3 > 20$$

where $v_3$ is the Abbe number of the material of the protection structure, and $v_4$ is the Abbe number of the material of the hemispherical component; and
    wherein the ratio WD/f is approximately 1.05, WD is the working distance of the microscope objective lens system and f is the focal length.

9. A microscope objective lens system with a protection component, comprising:
    a first lens group having a hemispherical lens component and a plano-parallel plate cemented to an object side of the hemispherical lens component, and where $45 > v_4 - v_3 > 20$, where, $v_4$ and $v_3$ are respectively Abbe numbers of the material of the plano-parallel plate and the hemispherical lens component; and
    wherein the following condition is met:

$$0.105 \leq d_3/d_4 \leq 0.305,$$

where $d_3$ is the thickness of said plano-parallel plate of the first lens group and $d_4$ is the thickness of said hemispherical lens component of the first lens group.

10. The microscope objective lens system of claim 9, where at least one of the following conditions is met:

$$0.28 > n_3 - n_2 > 0.12, \text{ and}$$

$$0.35 > n_4 - n_2 > 0.08,$$

where $n_3$ is the index of refraction of the material of plano-parallel plate of the first lens group, $n_2$ is the index of refraction of immersion liquid between the plano-parallel plate and a cover glass, and $n_4$ is the index of refraction of the material of the hemispherical lens component.

11. The microscope objective lens system of claim 9, where the following condition is met:

$$d_3 \cdot (n_3-1)/n^2{}_3 v_3 - 2 \cdot |S_4'{}^2 \phi_4 v_4| \leq 0;$$

where $v_4$ is the Abbe number of the material of the hemispherical lens, $v_3$ is the Abbe number of the material of the parallel plate, $d_3$ is the thickness of the plano-parallel plate, $\phi_4$ is the refractive power of the hemispherical lens component, and $S_4'$ is the image point distance of the hemispherical lens, and $n_3$ is the index of refraction of the material of the plano-parallel plate.

12. The microscope objective lens system of claim 9, where the following condition is met:

$$d_3 \cdot (n^2{}_3 - 1)/2n^3{}_3 \cdot \text{Sin } \phi^1 - 2 \cdot |h^2{}_4 \phi_4| \leq 0;$$

where $\phi^1$ is the angle between the upper marginal ray and the optical axis after the plano-parallel plate, $h_4$ is the height of the upper marginal ray for the hemispherical lens component, $n_3$ is the refractive index of the material of the plano-parallel plate, and $d_3$ is the thickness of the plano-parallel plate.

13. The microscope objective of claim 9, having a numerical aperture of about 1.25 and a magnification of about ×100.

14. The microscope objective of claim 9, further comprising:

a second lens group, juxtaposed to said first lens group;

a third lens group, juxtaposed to said second lens group, and having three cemented doublets; and a fourth lens group, juxtaposed to said third lens group, having two lens components which are respectively a positive and a negative meniscus arranged with their concave surfaces opposite each other.

15. The microscope objective of claim 9, further comprising:

a second lens group, juxtaposed to said first lens group, having an aplanatic meniscus lens component.

* * * * *

UNITED STATES PATENT AND TRADEMARK OFFICE
CERTIFICATE OF CORRECTION

PATENT NO. : 5,898,524
DATED : April 27, 1999
INVENTOR(S) : Lev Ryzhikov

It is certified that error appears in the above-identified patent and that said Letters Patent is hereby corrected as shown below:

Column 1, Equations 4 & 5
    delete "$\phi$" and insert --$\varphi$--

Column 2, line 1
    delete "$\phi_4$" and insert --$\varphi_4$--

Column 2, line 4
    delete "$\phi^1$" and insert --$\omega^1$--

Column 6, line 1 (Claim 3)
    delete "$\phi_4$" and insert --$\varphi_4$--

Column 6, line 12 (Claim 4)
    delete "$\phi^1$" and insert --$\omega^1$-- and delete "$_4\phi_4$" and insert --$_4\varphi_4$--

Column 7, line 15 (Claim 11)
    delete "$^2\phi_4\upsilon_4$" and insert --$^2\varphi_4/\upsilon_4$--

Column 8, line 1 (Claim 12); and
    delete "$\phi^1$" and insert --$\omega^1$--

UNITED STATES PATENT AND TRADEMARK OFFICE
CERTIFICATE OF CORRECTION

Page 2 of 2

PATENT NO. : 5,898,524
DATED : April 27, 1999
INVENTOR(S) : Lev Ryzhikov

It is certified that error appears in the above-identified patent and that said Letters Patent is hereby corrected as shown below:

Column 8, line 3
    delete "$\phi^1$" and insert --$\omega^1$--

Signed and Sealed this

Eighth Day of May, 2001

*Attest:*

NICHOLAS P. GODICI

*Attesting Officer*     Acting Director of the United States Patent and Trademark Office